B. G. NEWTON.
HYDRAULIC TRANSMISSION MECHANISM.
APPLICATION FILED SEPT. 25, 1919.

1,378,184.

Patented May 17, 1921.
2 SHEETS—SHEET 1.

INVENTOR
B. G. Newton
BY Howard P. Denison
ATTORNEY

B. G. NEWTON.
HYDRAULIC TRANSMISSION MECHANISM.
APPLICATION FILED SEPT. 25, 1919.

1,378,184.

Patented May 17, 1921.
2 SHEETS—SHEET 2.

INVENTOR
B. G. Newton
BY Howard P. Denison
ATTORNEY

UNITED STATES PATENT OFFICE.

BYRON G. NEWTON, OF SYRACUSE, NEW YORK.

HYDRAULIC TRANSMISSION MECHANISM.

1,378,184.  Specification of Letters Patent.  Patented May 17, 1921.

Application filed September 25, 1919. Serial No. 326,314.

*To all whom it may concern:*

Be it known that I, BYRON G. NEWTON, of Syracuse, in the county of Onondaga, in the State of New York, have invented new and useful Improvements in Hydraulic Transmission Mechanism, of which the following, taken in connection with the accompanying drawings, is a full, clear, and exact description.

This invention relates to certain improvements in hydraulic transmission mechanism, adapted to be used more particularly in the connection between the engine and differential gearing of a motor vehicle in place of the usual variable-speed power-transmission gears in which the forward speeds and reverse are controlled by the interengagement of gears of different fixed ratios, whereby the shifting from one gear ratio to another produces more or less abrupt changes in the speed of the machine, and consequent excessive strain upon the gears or else causes the clutch to slip, resulting in excessive wear of the clutch faces or possible stalling of the engine.

The main object of my present invention is to overcome these objectional features through the medium of a liquid circulatory passage or passages between coöperative driving and driven members in which the circulation of liquid, as oil, through said passage or passages is controlled at will in such manner that the speeds for forward or reverse drive may be regulated by infinitesimal gradations, or the fluid may be allowed to circulate freely through the passages to permit either the driving or driven member to rotate independently of the other member, as, for example, in starting the engine when the vehicle is at rest, or when the vehicle is coasting and the engine is at rest.

Other objects and uses relating to specific parts of the power transmission mehanism will be brought out in the following description.

In the drawings:—

Fig. 5 is a face view on a reduced scale of the reversing gearing.

As illustrated, this device comprises a gear case —1—, constituting a liquid container for receiving a quantity of liquid, as oil —2—, and the various parts of the device to which the invention is directed, said case being provided in its upper side with a hand-hole —3—, normally closed by a cover plate —4—. A driving shaft —5— is journaled in a suitable bearing —6— in one end of the gear case —1—, and is adapted to be connected in any well known manner to an internal combustion engine or motor of a vehicle or other machine to which this invention may be applied.

The inner end of the shaft —5— within the case —1— is rigidly connected by radial arms —7— to a gear ring —8— having external or peripheral teeth —9— and internal teeth —10—, said gear ring constituting what may be termed the driving member.

A relatively small gear —11— is journaled in suitable bearings on the upper portion of and within the case —1— and meshes with the adjacent teeth at the top of the gear ring —8— so as to produce close running contact therewith, the faces of the gear ring —8— and gear —11— being of uniform width so that the corresponding sides lie in substantially the same vertical plane.

Figure 2:
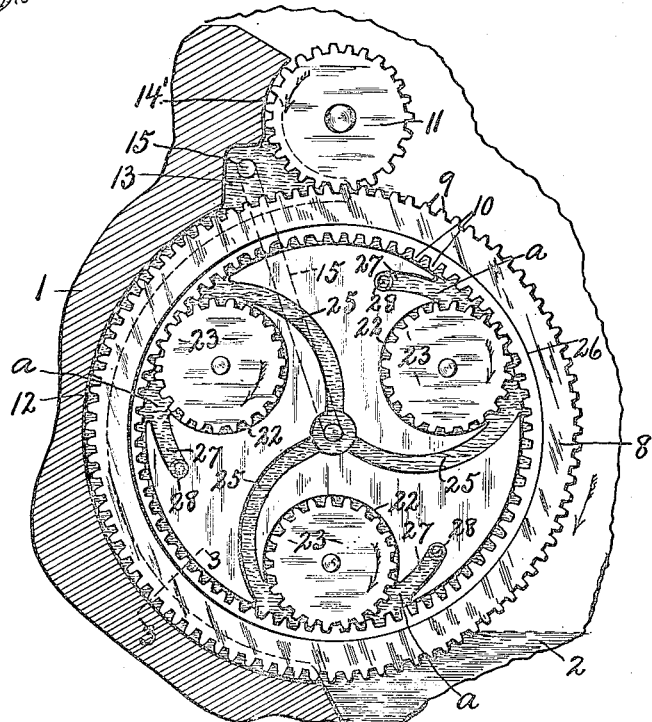
Fig. 2 is a transverse vertical sectional view taken in the plane of line 2—2, Fig. 1. except that the driving gears are shown in elevation, the major portion of the gear case being broken away.
Figure 3:
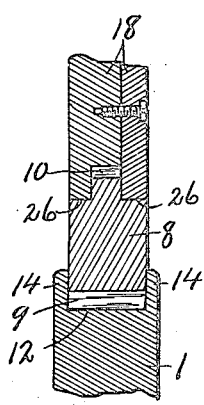
Fig. 3 is an enlarged detailed sectional view taken in the plane of line 3—3, Fig. 2.
Figure 4:
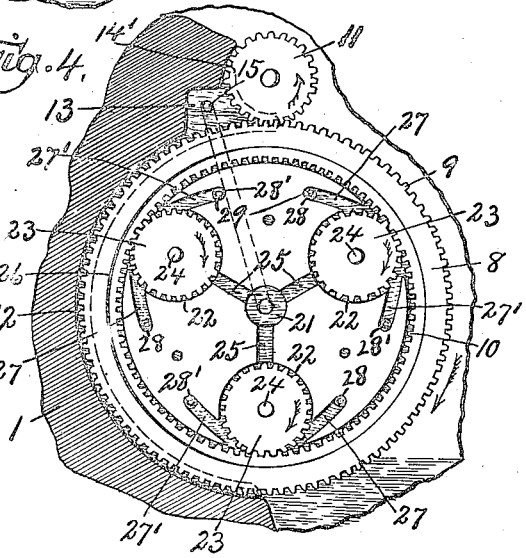
Fig. 4 is a transverse vertical sectional view similar to Fig. 2, but on a reduced scale, showing slightly modified circulatory passages for the liquid.

The gear ring —8— is adapted to be rotated in the same direction as the motor shaft, as indicated by arrows Figs. 2 and 4, and the major portion of the teeth at the upwardly moving side are adapted to travel in a circular or arcuate channel —12— in the inner face of the corresponding side of the case —1—, the width of the channel being approximately equal to that of the adjacent face of the gear ring, with just sufficient clearance to allow the latter to rotate freely therein without friction with the walls thereof, said channel extending from approximately the lowermost point around the upwardly moving side of the gear ring to a point within a relatively short distance from the points of engagement of the gear ring —8— and gear —11— where the radial depth of the channel is enlarged to form a relatively small reservoir —13— at the upper end of the channel between the base thereof and the adjacent portions of the peripheries of said gear ring 8 and gear 11.

The opposite walls, as —14—, of the channel —12— extend inwardly slightly beyond the bases of the gear teeth —9— and in close proximity to the opposite sides of the gear ring —8— while the outer or peripheral faces of the teeth of the gear ring travel in close proximity to the base of the channel —12—, the object of which is to cause the spaces between the teeth to serve as pockets in which the liquid is carried or conveyed by said teeth from the main body or reserve —2— upwardly into the supplemental reservoir —13— for distribution through suitable passages in the driven element presently described.

The major portion of the downwardly moving half of the peripheral teeth of the gear —11— also travel in a circular or arcuate channel —14'— in the case —1—, said channels —12— and —14'— merging with each other at the reservoir —13— so that they actually extend beyond the meshing points of both gears —8— and —11— in the direction of their movement, it being understood that the side walls of the channel —14'— extend beyond the bases of the teeth of the gear —11— in close proximity to the sides thereof, and that the outer peripheral faces of said gear teeth travel in close proximity to the base of the channel —14'—, so that the channels —12— and —14'— which are enlarged at their junction to form the reservoir —13— constitute what may be termed a housing for the adjacent portions of the peripheral teeth of the gear ring 8 and gear —11—, to enable the liquid to be conveyed in the manner previously described from the body —2— to the reservoir —13— and retained in said reservoir in sufficient quantities to supply the distributing passages previously mentioned.

Figure 1:
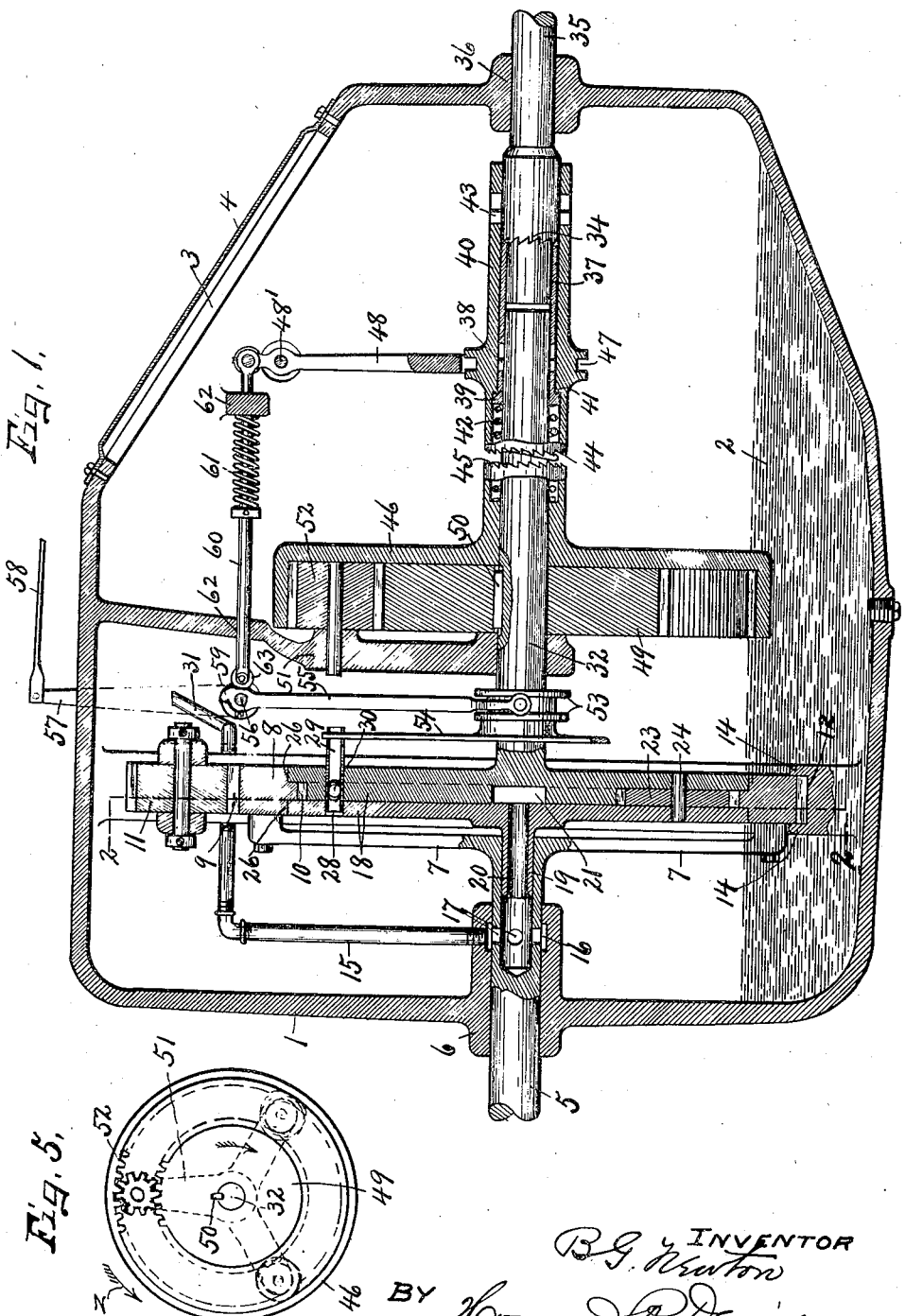
Figure 1 is a longitudinal vertical sectional view of the essential parts of a variable-speed and reverse drive mechanism embodying the features of my invention.

The reservoir —13— is connected at one side to the upper end of the feed pipe —15— having its lower end connected to an annular channel —16— which is formed on the inwardly projecting portion of the bearing —6— of the case —1—, as shown more clearly in Fig. 1.

The inner end of the driving shaft —5— is preferably hollow or tubular and is provided with radial openings —17— leading from the annular channel —16— to the interior thereof.

A driven element —18— is rotatably mounted within the gear ring —8— and is provided at one end with a central tubular hub —19— journaled in the adjacent tubular end of the driving shaft —5—, said hub being provided with a central passage —20— leading to a central chamber —21— in the main body of the driven member —18— to establish communication between said chamber and the feed pipe —15— through the radial passages —17—.

This driven member is also provided with a series of, in this instance, three circular pockets —22— spaced uniform distances apart circumferentially to the axis of said driven member and equal distances therefrom, for receiving a corresponding number of rollers —23— having peripheral gear teeth meshing with the internal teeth —10— of the gear ring —8—, the circular pockets —22— being open at the periphery of the driven member —18— to permit the teeth of said rollers to mesh with the internal teeth —10—.

These rollers —23— are journaled on pins —24— in opposite walls of the pockets —22— parallel with the axis of the driven member —18— and are of substantially the same diameter and width as that of the pockets —22—, with just sufficient clearance to enable them to rotate freely without excessive friction with the walls of said pockets.

The pockets —22— are connected by separate passages —25— to the central chamber —21— so that the liquid entering said chamber may also flow into the pockets at the periphery of the rollers —23—, aided by centrifugal force when the driven member is in action. The internal gear teeth —10— are formed upon the inner face of a central annular rib of the gear ring —8— which rib is of less width than that of the ring to form annular grooves —26— while the periphery of the driven member —18— is circular and projects into said grooves at opposite sides of the gear teeth and beyond the bases thereof to form close running joints with the gear ring, at the same time constituting a housing and annular channel in which the internal gear teeth —10— may travel, it being understood that the pockets —22— open into said channel and that the inner faces of the internal teeth —10— travel in close proximity to the inner wall of said channel between the pockets.

The passages —25— constitute inlets for the several pockets —22— and may be either tangential to said pockets, as shown in Fig. —2— or radial thereto, as shown in Fig. —4—, the object being to supply the liquid to the spaces between the internal teeth —10— so that it may be carried by said teeth through the peripheral channel of the driven member to said pockets some distance from the inlet points in the direction of rotation of the gear ring so that the liquid will tend to accumulate at the points "a" when the device is in operation for forward drive.

The pockets —22— are provided with lateral branches —27— which, for convenience of description, may be termed outlets, as distinguished from the inlet passages —25—, and are formed in the driven element —18— approximately tangential to the outer portions of the pockets —22— and terminate in lateral openings —28— in which are movable tubular slide valves —29—. Each slide valve is provided with a radial opening —30— movable into and out of registration with the branch passages —27— for controlling the flow of liquid therethrough, said valve openings —28— communicating with the interior of the case —1—, as shown more clearly in Fig. 1.

An over-flow pipe —31— leads from the side of the reservoir —13— opposite that to which the feed pipe —15— is connected, and communicates with the interior of the case to prevent back-pressure of liquid upon the gears —8— and —11— in case the liquid should be supplied to the reservoir faster than it is distributed through the feed pipe —15— and passages —25—.

The driven member —18— is preferably made in two parts for convenience of forming the pockets —22— and passages —25—, said parts being rigidly secured together by any suitable fastening means after the pockets and channels are formed and the rollers —23— incorporated therein, said driven member being provided with a central lengthwise shaft portion —32— for a purpose hereinafter described.

In Fig. —4— I have shown each pocket —22— as provided with a pair of oppositely disposed branches —27— and —27′— terminating in valve chambers —28— and —28′— for receiving slide valves —29— similar to that previously described, the object of the extra branch —27′— and its valve chamber —28′— and corresponding valve being to provide means whereby the driven member —18— may be prevented from rotating faster than the driving member, as, for example, when the machine is traveling down-grade or under any other conditions when the tendency is to rotate the driven member at a higher rate of speed than that of the driving member, it being understood that these retarding influences of the driven member will be transmitted to the engine pistons, which, in turn, will serve on the compression strokes to retard the speed of the machine and thereby introduce a factor of safety in descending steep hills. These branch passages also permit the momentum of the machine which is imparted to the driven element to function as a starter for the engine in case the latter has been stopped while the machine is coasting, the retarding and starting action being hereinafter more fully explained in the operation of the purely hydraulic feature of my invention which is as follows:

Assuming that level of the liquid in the case —1— is sufficiently high to cover the lowermost external teeth of the gear ring —8— and that the latter is being driven by an internal combustion engine of a motor vehicle, and that the valve —29— is open or in its neutral position, then the external teeth of the gear ring —8— traveling in the liquid body —2— will cause a portion of said liquid to be carried upwardly by the upwardly moving teeth of the gear ring —8— through the channel —12— and into the supplemental reservoir —13— from which it will flow through the feed pipe —15— into the central chamber —21— and thence through the passages —25— to the several pockets —22— whereupon the teeth of the rollers —23— will carry the liquid from the ends of the passages —25— to the mouths "a" of the branch passages —27— whence it will escape through the open valves —29—into the interior of the case without effecting any rotary movement of the driven member —18—.

Now, if the valves —29— are simultaneously closed to cut off the escape of the liquid from the branches —27—, it is evident that the tendency of the liquid to accumulate in the closed branches will prevent further rotation of the rollers —23— about their axes, thereby establishing a liquid lock between said rollers and gear ring —8— which in turn will cause a transmission of rotary motion from said gear ring to the driven member in the same direction for propelling the machine forward.

It is also evident that the degree of closing or opening of the valves —29— will regulate the degree of liquid lock in the branches —27— and will thereby enable the operator to vary the speed of the machine according to the degree of closing of the valves and will also permit the machine to be started gradually without perceptible shock or liability of stalling the engine by simply closing the valve gradually.

If the driving and driven elements are locked together in the manner just described and the machine is descending an incline with the clutch between the driving shaft —5— and engine engaged at which time the momentum of the machine tends to rotate the driven member faster than the driving member or speed of the engine it, of course, would tend to reverse the direction of rotation of the rollers —23— with the result that the liquid would be conveyed from the branch —27— to the branch —27′— providing the valves in the last named branch are open, but if these valves are closed it would cause a liquid lock of their respective rollers against reverse rotation, and under these conditions the rollers being locked against rotation in either direction upon their axes, it is evident that the tendency of the driven member to revolve faster than the driving member would be reduced to a minimum and would thereby cause both driving and driven members to rotate in unison or at the same speed, and permit the compression strokes of the pistons of the engine to act as retarding means to such momentum.

On the other hand, assuming that the valves in the branch passages —27'— are open, and that the machine is coasting under its own momentum with the engine and driving element at rest and it becomes desirable to start the engine automatically by the momentum of the machine, then it would be simply necessary to close the valves in the branches —27'— which would instantly lock the rollers against a tendency to rotate in a direction opposite that indicated by the arrows, thereby locking the then rotating driven member to the driving element or ring —8— to transmit motion to the engine for starting the same, after which said engine would operate under its own power, the valves in the branch passages —27'— being then open and the valves in the branch passages —27— closed as soon as the engine is started.

The shaft —32— as a part of the driven element is normally connected by a clutch —34— to a co-axial shaft section —35— which in turn is adapted to be connected through the usual differential gearing and shafts to the traction wheels of the machine for forward drive, the shaft section —35— being journaled in bearing —36— in the adjacent end of the case —1—.

One of the sections of the clutch —34— is formed integral with the shaft —35—, the other clutch section forming a part of a sleeve —37— which is slidable on the adjacent ends of the shaft sections —32— and —35—, it being loose on the shaft section —35—, but is splined or feathered by keys —38— to the shaft —32— and is provided at its inner end with an annulus —39—, Fig. 1, for engagement with an outer axially movable sleeve or collar —40— having an annular shoulder —41— against which the annulus —39— is yieldingly held by a coiled spring —42—.

The collar —40— is splined or feathered to the shaft section —35— by means of keys —43— while its inner end is provided with clutch teeth —44—, normally separated from but adapted to engage similar clutch teeth —45— on the adjacent end of the hub of an internal gear —46— hereinafter described, the intermediate portion of said collar being provided with an annular groove —47— for engagement by a shifting lever —48— whereby the collar —40— and sleeve —37— may be moved axially against the action of the spring —42— for disengaging the clutch —34— and engaging the clutch face —44— with its companion clutch face —45— when it is desired to reverse the direction of rotation of the shaft section —35— or direction of motion of the machine. The internal gear —46— constitutes part of the reversing mechanism and for this purpose is loosely mounted upon the shaft —32— so as to surround the co-axial spur gear —49— which is secured to the shaft —32— by the key —50—.

Loosely mounted upon the shaft —32— is a stationary radial arm —51— connected to the stationary bearing —62— of the case as shown in Fig. —1— and carrying a pinion —52— which meshes with the internal gear —46— and spur gear —49— so that when the spur gear is driven by the shaft —32— in the direction indicated by the arrow, Fig. 5, with the sleeve —37— and collar —40— in their normal positions for direct drive, shown in Fig. 1, the internal gear —46— will be driven in a reverse direction indicated by arrow "z," Fig. 5.

Now, if it is desired to reverse the direction of motion of the machine, it is simply necessary to shift the collar —40— through the medium of the lever —48— so as to cause its clutch face —44— to engage the adjacent clutch face —45— on the hub of the internal gear —46— by which operation the sleeve —37—will be similarly shifted in the same direction to disengage its clutch —34— from the shaft —35— and allow the latter to be driven in a reverse direction by the collar —40— which is then engaged with the reversely moving gear —46—.

As soon as the shifting mechanism for the collar —40— and sleeve —37— is released, those parts are returned to their normal positions by the spring —42—.

Suitable means is provided for synchronizing the adjustment of the collar —40— and sleeve —37— with the movement of the valves —29— and for this purpose is provided a grooved collar —53— which is slidable axially on the shaft —32— and is provided with radial arms —54—, connected to the outer ends of their respective valves —29—, as shown in Fig. 1, so that all the valves may be operated simultaneously by the axial shifting of the collar.

A shifting lever —55— is secured to a rock shaft —56— within the case —1—, said rock shaft being provided with an extension —57— which may be connected by a link —58— to any suitable handle or pedal within convenient reaching distance of the operator for effecting the axial movement of the collar —53— and corresponding movement of the valves —29— connected thereto. A cam —59— is mounted upon the rock shaft —56— and preferably integral with the shifting arm —55— for effecting the operation of the clutch shifting lever —48— through the medium of a rod —60— and spring —61—, said rod being slidable in suitable bearings —62— within and upon the case —1—, one end being pivotally connected to the short arm of the lever —48— which is fulcrumed at —48′—, the other end of said rod being provided with a roller —63— for engagement with the cam —59—, whereby when the lever —55— is operated in one direction to close the valves —29—, the rod —60— will be shifted endwise to operate the collar —40— for disengaging the clutch —34— and connecting the clutch faces —44— and —45—, the spring —61— serving to restore the clutches to their normal positions when the operating lever —55— is released.

On the other hand, for direct operation, the lever —55— is shifted in the opposite direction, thereby effecting a corresponding closing movement of the valves —29— the openings —30— in said valves permitting them to close by movement in either direction.

What I claim is:

1. Hydraulic power transmitting mechanism comprising, in combination, a liquid container, relatively rotatable driving and driven elements, a rotary member journaled on one of said elements and having rolling contact with the other element, said driven element having circulatory passages for the liquid, means on the driving element for feeding the liquid in the container into one of the said passages, means on said member for feeding liquid from said one of the passages to the other passage, and means operable at will for opening and closing the last named passage to regulate the flow of liquid therethrough and to thereby lock said member against rotation about its axis when the last named passage is closed, whereby to cause rotation of the driven element.

2. Hydraulic power transmitting mechanism comprising relatively rotatable co-axial driving and driven elements, a rotary member journaled on the driven element at one side of its axis for rolling contact with the driving element, a liquid containing case inclosing said element, said driven element having passages leading to and from said member, means on the driving element for feeding liquid in the case to a point where it will flow into the passage leading to said member, means on said member for feeding the liquid supplied thereto to the passage leading from said member, the last named passage discharging into the interior of the case, and a valve for opening and closing the last named passage.

3. Hydraulic power transmitting mechanism comprising relatively rotatable driving and driven elements, the driving element being provided with a circular row of conveyer members, a liquid containing case having a channel in which said conveyer members travel, said driven member being provided with a pocket and passages leading to and from said pocket, a rotary member mounted in said pocket in rolling contact with the driving member and provided with a circular row of conveyer members for feeding the liquid from one passage to the other when rotated by the driving element relatively to the driven element, a valve in one of said passages for controlling the flow of liquid therethrough, and means for receiving the liquid from the first named conveyer members and conducting it to one of said passages.

4. Hydraulic power transmitting mechanism comprising a case having a main reservoir and a supplemental reservoir, and also provided with a channel connecting said reservoirs, relatively rotatable driving and driven elements, the driving element having means moving in said channel for conveying the liquid from the main reservoir to the supplemental reservoir, the driven element being provided with a pocket having an inlet passage communicating with the supplemental reservoir and an outlet passage discharging into the main reservoir, a rotary member mounted in said pocket in rolling contact with the driving element, and a valve for opening and closing the outlet.

5. In hydraulic power transmitting mechanism the combination of a case having a main reservoir and a channel, co-axial driving and driven elements, relatively rotatable in the case, the driven element being provided with a circular pocket having an inlet communicating with the channel and an outlet communicating with the main reservoir, means on the driving element for conveying liquid from said reservoir through the channel to the inlet of the pocket, a rotary member in the pocket in rolling contact with the driving element and provided with means for conveying liquid from the inlet to the outlet, and a valve in the outlet passage operable at will for controlling the flow of the liquid therethrough.

6. In hydraulic power transmitting mechanism the combination of a case having a liquid reservoir, co-axial driving and driven elements relatively rotatable in the case, the driven element being provided with a pocket having an inlet and an outlet, a conduit communicating with the inlet, means on the driving member for conveying liquid from said reservoir to said conduit, a circular member rotatably mounted in the pocket in rolling contact with the driving element and provided with means for conveying liquid from the inlet to the outlet, and a valve in the outlet operable at will to control the passage of liquid therethrough.

7. In hydraulic power transmitting mechanism the combination of a case having a reservoir and a channel, a conduit communicating with said channel, a gear ring rotatably mounted within the case and provided with peripheral gear teeth traveling in the channel for conveying liquid from the reservoir to the conduit, said ring being provided with internal teeth, a driven element rotatably mounted in the case co-axial with the ring and provided with pockets each having an inlet and an outlet, the inlets communicating with said conduit, gears rotatably mounted on the driven element within said pockets and meshing with the internal gear, valves in the outlets for controlling the passage of liquid therethrough, and means operable at will for adjusting the valves simultaneously.

8. In hydraulic power transmitting mechanism, the combination of a case having a main reservoir and a supplemental reservoir and a channel connecting said reservoirs, a gear ring rotatably mounted in the case and provided with peripheral teeth moving in the channel for conveying liquid from the main reservoir to the supplemental reservoir, said ring being also provided with internal teeth, a driven element rotatably mounted within the case co-axial with the ring and provided with a pocket having an inlet and an outlet, a conduit leading from the supplemental reservoir to the inlet, a gear rotatably mounted on the driven element within said pocket and meshing with the internal gear, and a valve in the outlet operable at will for controlling the passage of liquid therethrough.

9. In hydraulic power transmitting mechanism the combination of a case having a main reservoir and a supplemental reservoir and a channel connecting said reservoirs, a ring rotatably mounted within the case and provided with external and internal teeth, the external teeth being movable in the channel for conveying liquid from the main reservoir to the supplemental reservoir, a driven element rotatably mounted within the case co-axial with the ring and provided with pockets each having an inlet and an outlet, a conduit leading from the supplemental reservoir to the inlets, gears rotatably mounted on the driven element within said pockets and meshing with the internal gear teeth, and valves in the outlets controlling the passage of liquid therethrough.

In witness whereof I have hereunto set my hand this 17th day of September, 1919.

BYRON G. NEWTON.

Witnesses:
H. E. CHASE,
MARGARET L. STOUP.